Nov. 18, 1952          H. J. HORN          2,618,513
COVER PLATE FOR VEHICLE WHEELS

Filed Nov. 25, 1947          2 SHEETS—SHEET 1

Inventor
HARRY J. HORN

By Barnes, Kisselle, Laughlin & Raisch
Attorneys.

Nov. 18, 1952  H. J. HORN  2,618,513
COVER PLATE FOR VEHICLE WHEELS
Filed Nov. 25, 1947  2 SHEETS—SHEET 2

Inventor
HARRY J. HORN
By Barnes, Kisselle, Laughlin & Raisch
Attorneys.

Patented Nov. 18, 1952

2,618,513

UNITED STATES PATENT OFFICE 2,618,513

COVER PLATE FOR VEHICLE WHEELS

Harry J. Horn, Lansing, Mich., assignor to Motor Wheel Corporation, Lansing, Mich., a corporation of Michigan Application November 25, 1947, Serial No. 787,910

4 Claims. (Cl. 301—37)

This invention relates to a cover plate for a vehicle wheel.

It is old to provide a vehicle wheel with a cover plate to dress up the wheel and cover the means which secures the wheel to the hub. In the prior art it has been common to attach the cover to the wheel by spring clips so that the cover has a metal to metal contact with the clips and also with the wheel. Such metal to metal contact is particularly undesirable when the vehicle is traveling along rough road in that it is a frequent source of undesirable noise.

It is an object of this invention to produce a wheel cover which is secured to the wheel so that the cover will not create any noise regardless of the roughness of the road over which the vehicle is traveling.

The invention also contemplates a wheel cover which can be easily assembled to, and disassembled from, the wheel.

These objects are accomplished by providing the wheel cover with distortable or elastic rubber connections which actually float the wheel cover on the wheel and thus avoid any metallic contact between the metal wheel cover and the metal wheel.

Figure 1:
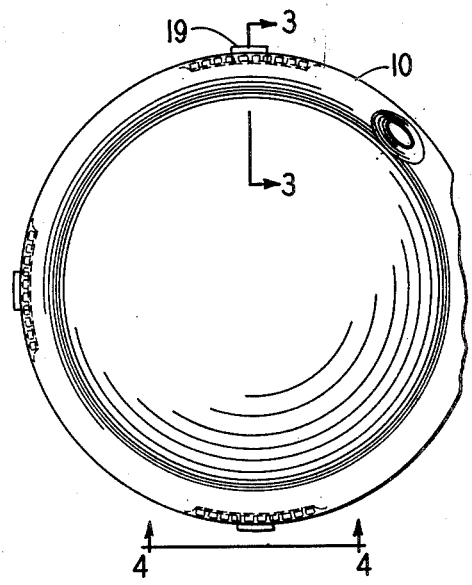
Fig. 1 is an elevation of my wheel cover with the rubber units in place.

Referring more particularly to the drawings, the wheel cover 10 is shown mounted on a conventional wheel comprising a body 11 and rim 12. Rim 12 is provided with a circumferential groove 13 positioned inwardly of tire retaining flange 14. Cover 10 is preferably stamped from a square metal blank and the corners of the blank are utilized to form peripheral flange portions 15 at the four corners of the blank. The outer edge of each flange 15 takes the form of a channel section 16, the outer wall of which is slotted as at 17 to provide a plurality of spaced fingers 18. Channel 16 serves as a pocket for a plurality of elastic blocks 19 which are preferably made of rubber, either synthetic or natural. Blocks 19 are retained in channel 16 by bending fingers 18 inwardly to clinch the blocks in channel 16.

For purposes of description, I have shown four rubber blocks 19 on the wheel cover but the cover can be retained upon the wheel by using three or more rubber blocks 19.

Cover 10 is provided with an opening 20 for the valve stem 21 which is secured on the inner tube 22. Cover 10 is mounted upon the vehicle wheel by placing one or two of the rubber blocks 19 in groove 13 and then by inserting a screwdriver or similar tool in the slot between rim 12 and flange 15 and opposite the said blocks, then the screw-driver can be used as a lever to compress the one or two rubber blocks first placed in the groove and then the rubber blocks nearest the screw-driver can be easily pushed or forced into place in groove 13. The rubber blocks 19 will be distorted and under compression but it should be noted that the blocks 19 project beyond the circumference of cover 10 and thus provide a clearance 23 between the circumferential edge of cover 10 and rim 12 so that there is no metal to metal contact between the vehicle wheel and cover 10. Rubber blocks 19 actually float cover 10 upon the vehicle wheel. It is obvious that the installation or removal of the cover is a simple operation requiring no skill.

Figure 5:
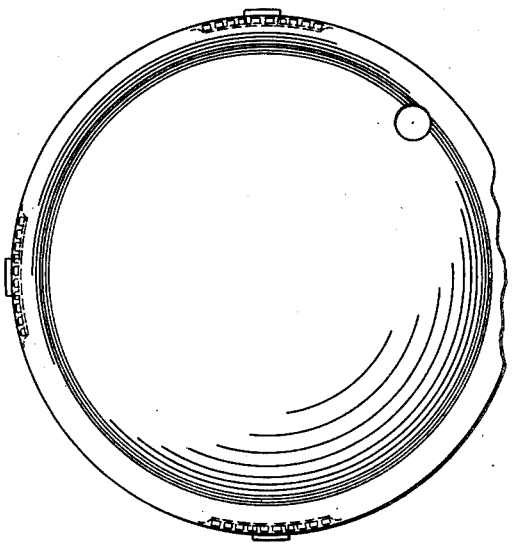
Fig. 5 is an elevation showing a slightly modified form of my wheel cover.
Figure 6:
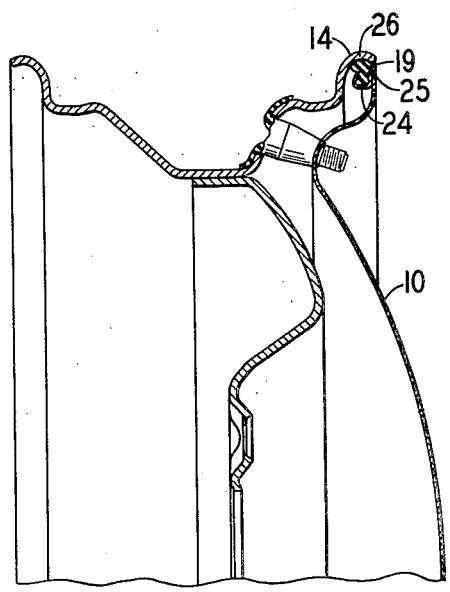
Fig 6 is a vertical sectional view through a wheel with the cover of Fig. 5 mounted thereon.
Figure 3:
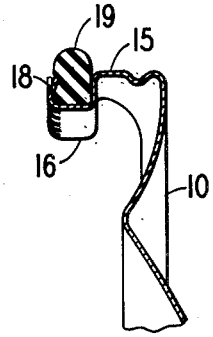
Fig. 3 is a section along the line 3—3 of Fig. 1.
Figure 4:
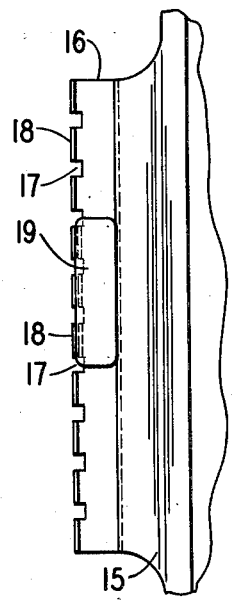
Fig. 4 is a fragmentary elevation taken along the line 4—4 of Fig. 1.

In the form of invention shown in Figs. 5 and 6, the rubber blocks 19 are retained in channels 24 similar to channels 16 but each channel 24 is formed contiguous to the peripheral edge 25 of cover 10 by return bending a portion of the peripheral edge of cover 10. Further, rubber blocks 19 yieldably interengage the circumferential groove 26 formed in the tire retaining flange 14. Installation and removal of this form of cover 10 is the same as described above. Here again it should be noted that rubber blocks 19 float the cover 10 on the wheel and there is no metal to metal contact between cover 10 and the wheel.

Figure 2:
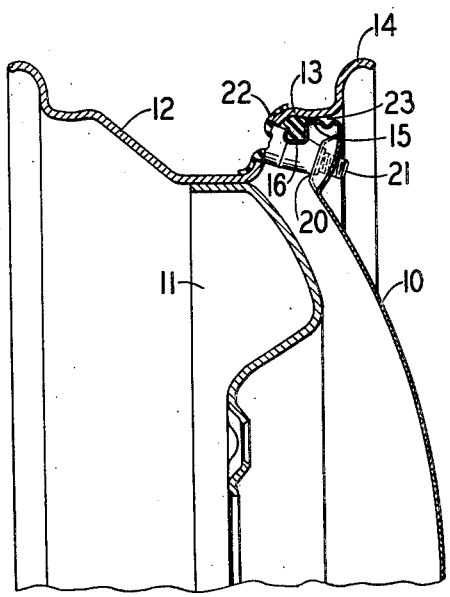
Fig. 2 is a vertical sectional view through a wheel upon which the cover of Fig. 1 is mounted.
Figure 7:
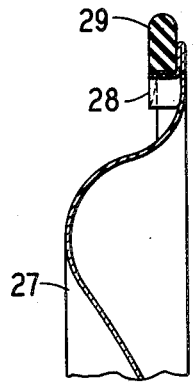
Fig. 7 is a fragmentary section of a wheel cover showing a modified mounting of the rubber units on the cover.

The modification shown in Fig. 7 differs from the cover shown in Figs. 1 and 2 in that the cover 27 is provided with circumferentially spaced flange portions 28 of L section. The rubber blocks 29 are vulcanized permanently to these flange portions 28. Rubber blocks 29 retain the cover on the wheel in the same manner as blocks 19.

Figure 8:
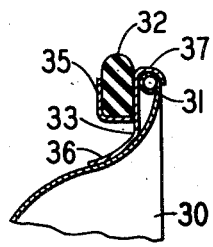
Fig. 8 is a fragmentary vertical section showing a further modified mounting of the rubber units on the wheel cover.
Figure 9:
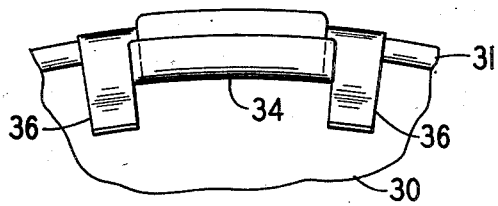
Fig. 9 is a fragmentary elevation of the wheel cover and mounting shown in Fig. 8.

In the form shown in Figs. 8 and 9 the cover 30 is provided with a peripheral bead 31. Each rubber block 32 is carried in a metal retainer 33. Retainer 33 is preferably a metal stamping having a channel portion 34 which receives rubber block 32 and the outer wall 35 of the channel is bent slightly inwardly to clinch the rubber block 32 in position. The stamping is provided with a pair of legs 36 which are shaped to conform to the contour of cover 30 and are welded thereto. The upper edge 37 of retainer 33 is of arcuate cross section and overlies bead 31. Retainer 33 is either welded, riveted or otherwise secured to cover 30.

Since the blocks (19, 29, 32) are made from any elastic distortable material such as rubber, the cover is floated on the vehicle wheel thus avoiding all metal to metal contact and preventing any rattling or any squeaking which would result from the cover rubbing against the wheel. Since the cover is floated upon the wheel, the cover is not distorted by any normal deflection of the wheel as the car travels over the road because normal wheel deflection is permitted by distortion or deflection of the rubber blocks without transmitting the deflecting forces to the cover. The use of rubber blocks for mounting the cover on the wheel also permits the cover to be made of any material desired, either metal or non-metal, and the cover can be made of any design desired because the rubber blocks do not interfere with the styling of the cover.

Although the rubber blocks 19, for illustrative purposes, are shown extended beyond the circumference of the cover it is, of course, appreciated that this is a preferred but not a necessary arrangement because the important point is that the rubber blocks must hold the cover out of any metallic contact with the rim. If desired, it is obvious that the circumferential edge of the cover can extend diametrically beyond the rubber blocks just as long as the blocks hold the cover out of metallic contact with the rim.

It is also appreciated that the position of the rubber blocks 19 can be reversed, that is, the rubber blocks can be vulcanized or otherwise affixed to the inner face of the rim 12 and the blocks will interengage in a groove provided in flange 15 of the cover for releasably fastening the cover to the wheel rim without any metallic contact therebetween. It should also be noted that the rubber blocks are the sole means for fastening the cover to the wheel.

I claim:

1. In combination with a vehicle wheel having a rim with a circumferential groove on its inside face, a cover having its circumferential edge spaced from the rim, at least three rubber blocks mounted on said cover plate and projecting beyond the periphery of the cover plate, said rubber blocks interengaging said groove on the rim and held under compression thereby the cover plate is floated upon said rim, said rubber blocks being equally spaced about the circumference of said cover and the sole means for holding the cover on the rim.

2. In combination with a vehicle wheel having a rim with at least three socket portions formed on the inner face of the rim, a cover for mounting on the rim and having a smaller circumference than the circumference of the adjacent portion of the rim, at least three circumferentially spaced rubber blocks mounted on said cover and projecting beyond the circumference thereof, the said blocks interengaging the socket portions in said rim so that they are held in compression and thereby float the wheel cover on the rim, said rubber blocks being the sole means for holding the cover on the rim.

3. A cover for a vehicle wheel having at least three axially extending spring fingers positioned adjacent the periphery of the cover and a rubber block mounted on each of said fingers, said blocks being equally spaced around the circumference of said cover and being adapted for removably fastening the cover on a vehicle wheel and cooperating with said spring fingers as the sole means for retaining the cover on the wheel.

4. In combination with a vehicle wheel having a rim with three socket portions formed on the inner face of the rim, a cover for mounting on the rim, said cover having at least three axially extending resilient fingers positioned adjacent the periphery of the cover, a rubber block supported on each of said resilient fingers, the said blocks being equally spaced around the circumference of said cover and interengaging the socket portions in said rim so that the rubber blocks are held in compression and the spring fingers in tension to thereby float the wheel cover on the rim with the cover spaced from the rim, said rubber blocks and spring fingers being the sole means for holding the cover on the rim.

HARRY J. HORN.

REFERENCES CITED

The following references are of record in the file of this patent:

UNITED STATES PATENTS

| Number | Name | Date |
|---|---|---|
| 2,005,626 | Maranville | June 18, 1935 |
| 2,016,395 | Sinclair | Oct. 8, 1935 |
| 2,076,789 | LeJeune | Apr. 13, 1937 |
| 2,404,389 | Lyon | July 23, 1946 |